FIG.9

VIDEO SEPARATOR

FIG.8

INVENTOR.

*INVENTOR.*

RESET INPUT

FIG. 17

| FIG.15 | FIG.16 |

United States Patent Office 3,510,669
Patented May 5, 1970

1

3,510,669
TELEVISION SYSTEM
John Peraza, New York, N.Y., assignor to Photronics Corporation, Flushing, N.Y., a corporation of New York
Filed Aug. 4, 1967, Ser. No. 658,397
Int. Cl. H04n 3/22
U.S. Cl. 178—6.8                           10 Claims

ABSTRACT OF THE DISCLOSURE

A television system in which video information is precisely positioned on a cathode ray receiver tube screen. The precise positioning is effected by including, in the video information signal, pulses representing picture position information. The pulses are separated from the video information as photographed by a camera and are also separated from the picture produced in the receiver tube. The respective sets of pulses are applied to associated digital counters and the contents of the counters are compared in digital comparison means. Any difference in the aforesaid contents, as indicated in the comparison means, is applied as a modifying signal to the receiver tube horizontal ramp signal to precisely position the picture on the cathode ray tube screen.

---

This invention relates to television systems. More particularly it relates to an improved television system characterized by great accuracy in the registration of video information.

It is an important object of this invention to provide a television system wherein the positioning of the video information on a receiver tube screen is precisely controlled.

Generally speaking and in accordance with the invention, there is provided a television providing cathode ray beams, camera means for providing a combined electric signal comprising a first electrical signal representing video information relative to a video target and pulses representing a predetermined horizontal position of the video information on the screen of the camera. There is further included cathode ray beam receiver tube means for receiving the aforesaid video information on its screen and for producing pulses representing the horizontal position of the received video information on the receiver tube screen. Camera control means are provided responsive to the application thereto of the combined signal for producing a horizontal ramp signal and a vertical ramp signal for application to the receiver tube means. A video separator is included which in response to the application thereto of the combined signal separates the first signal from the camera produced pulses. First and second like binary counters are provided and means are included for applying the first signal to the receiver tube means, for applying the camera-produced pulses to the first counter and for applying the receiver tube pulses to the second counter. Digital comparison means are included in circuit with the first and second counters for comparing the contents of the counters to produce an output representing a difference therebetween, and means are provided for modifying the horizontal ramp signal with the last-named difference output.

2

For a better understanding of the invention, together with other objects and features thereof, reference is had to the following description taken in conjunction with the accompanying drawings, and its scope is pointed out in the appended claims.

In the drawings, FIGS. 1 and 2, taken together as in FIG. 3, comprise a blank diagram of an illustrative embodiment of a television system constructed in accordance with the principles of the invention;

FIGS. 20a to 10e comprise a timing diagram of pertinent information occurring at different points in the system of FIGS. 1 to 3.

Figure 1:
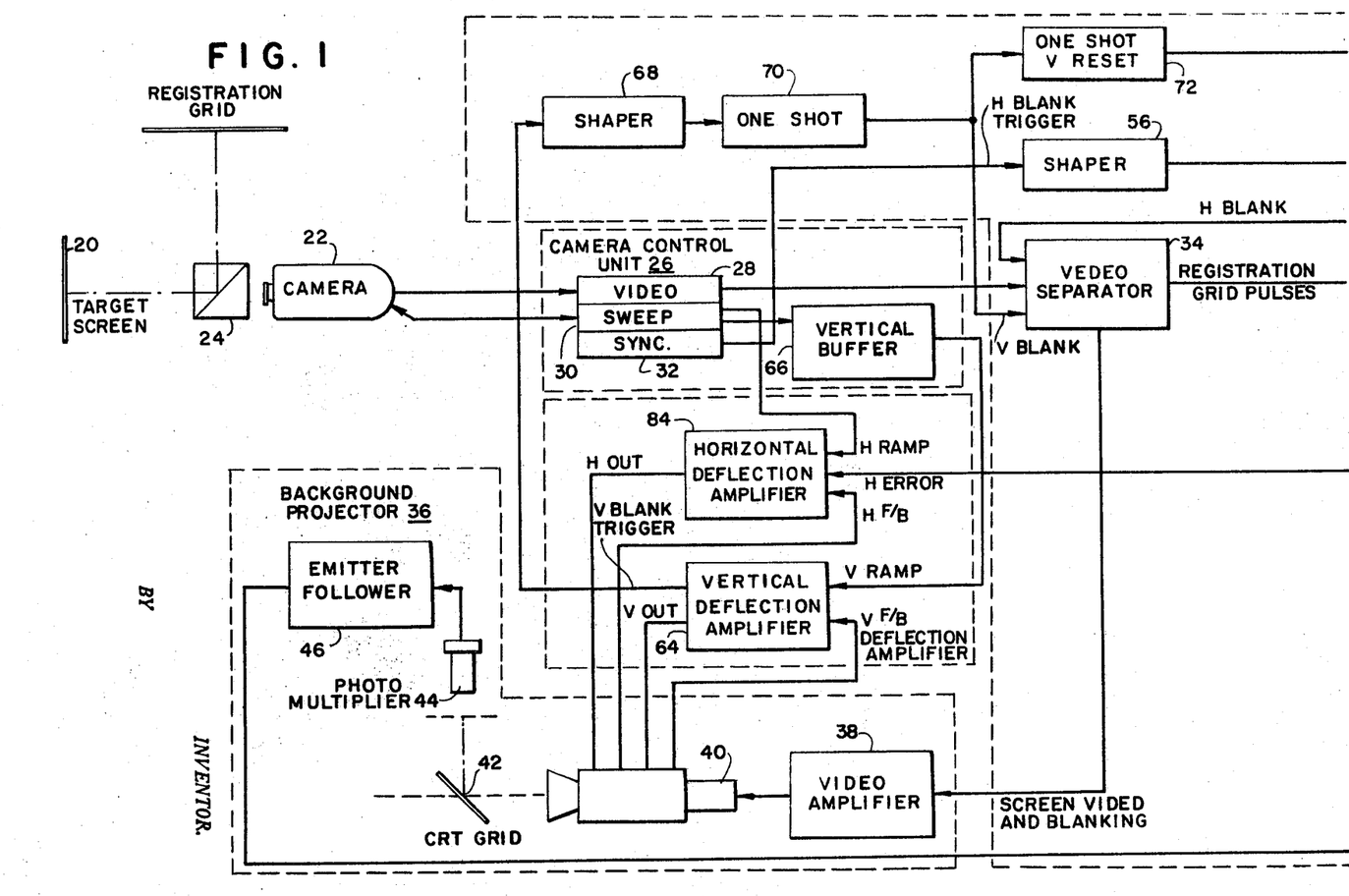
Figures 2, 3:
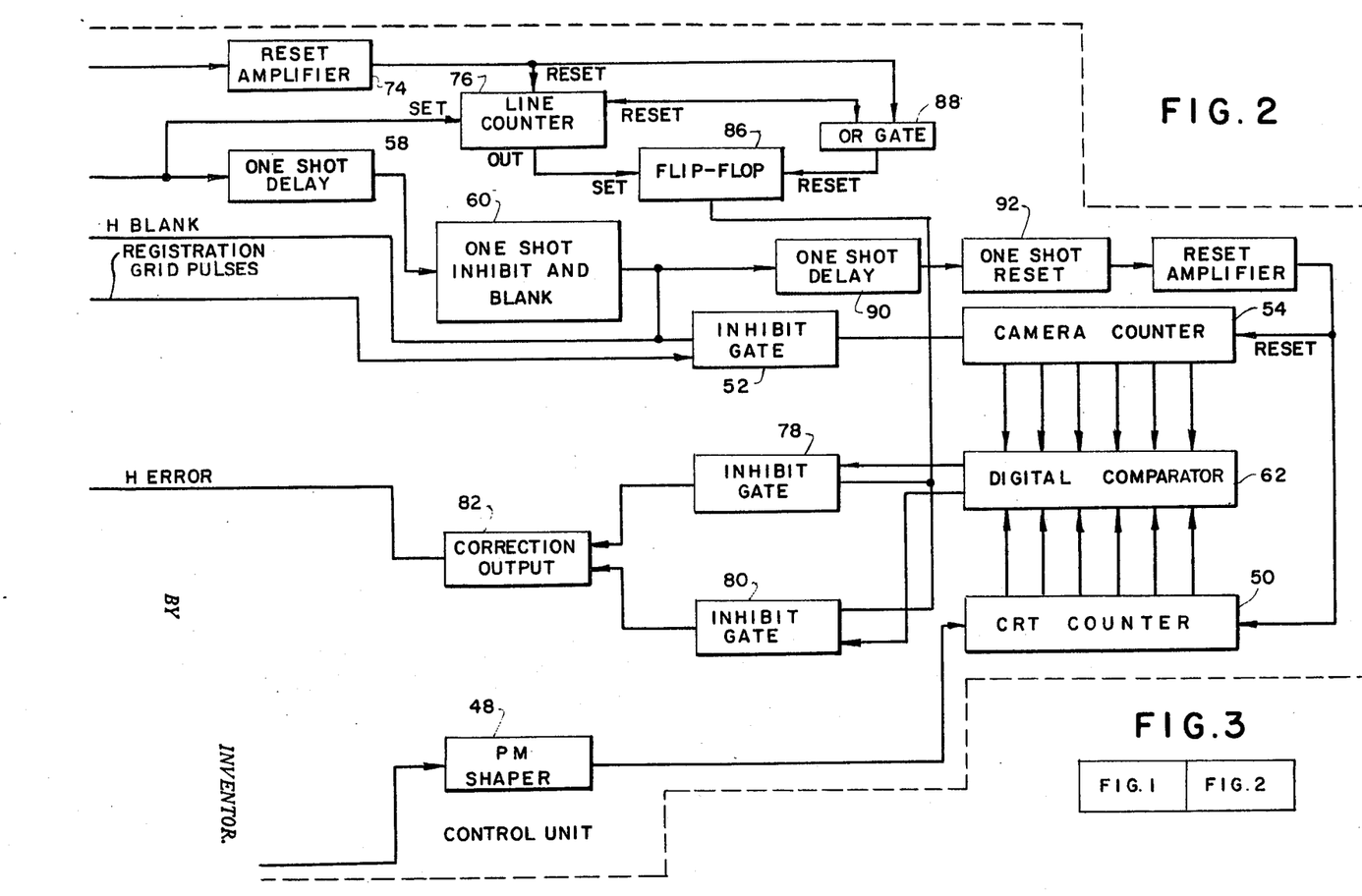

Referring now to FIGS. 1 to 3 wherein is shown, in block diagram form, an illustrative embodiment of a television system constructed in accordance with the principles of the invention. The visual information to be handled by the system appears on a target screen 20. Such visual information is scanned by a suitable television camera 22 having a quadrilled registration grid, and semitransparent mirror 24 associated therewith whereby the output of camera 22 contains both image and registration grid information.

The output of camera 22 is applied as input to a camera control unit, generally designated by the numeral 26. Specifically, the output of camera 22 is applied as input to a video amplifier 28 in camera control unit 26, wherein it is suitably amplified, the amplified camera output being applied as an input to a video separator stage 34 which operates to separate the combined camera video signal output into image video information and registration grid pulses. The image video information output of video separator stage is applied to a video amplifier stage 38 in a background projector unit, generally designated by the numeral at 36. The video image information, amplified in video amplifier 38, is applied as an input to a cathode ray tube 40 for video presentation.

In addition to providing the video presentation of the visual information, cathode ray tube 40 has associated therewith a grid which is identical with registration grid 24 associated with camera 22. The cathode ray beam of receiving tube 40 traverses grid 42 to generate a series of pulses, the time position of the latter pulses providing a measurement of the horizontal position of the cathode ray tube beam relative to the position of the beam of camera 22. These pulses are applied through a photomultiplier tube 44 and a line impedance matching emitter follower 46 to a photomultiplier tube output pulse shaper 48 which operates to provide a substantially constant-amplitude output for both the bright and silhouetted areas of the visual image in receiver cathode ray tube 40. The count of the grid output of pulse shaper stage 48 represents the horizontal position of the beam of receiver cathode ray tube 40. Accordingly, the output of pulse shaper 48 is applied to a binary counter, i.e., stage 50 legended as a cathode ray tube counter. Counter 50 suitably is a counter of the binary type and may comprise, for example, a serially collected flip-flop whereby a count up to 2 may be provided.

The registration grid pulse information from camera 22, i.e., the pulses produced at the output of video separator stage 34, is applied to a counter 54 legended as a camera counter, and which is similar in structure and function to that of cathode ray tube counter 50, through an inhibit gate 52. A count of the tube output from video separator stage 34 represents the horizontal position of the beam of camera tube 22.

The camera pulse output from video separator 34 is passed through inhibit gate 52 to prevent the counting in counter 54 of spurious pulses produced during counter reset and video blanking times. In the operation of inhibit gate 52, the horizontal blanking trigger signal produced by the synchronizing circuit 32 in camera control, unit 32 is properly shaped in a shaper circuit 56, the output of shaper 56 being applied to a monostable multivibrator 58, legended as one-shot delay stage, which suitably provides a relatively short delay substantially corresponding in width to the width of the horizontal blanking signal, at the end of which, it triggers a monostable multivibrator 60, legended as a one-shot inhibit and blank stage to its astable state. The astable period of monostable multivibrator 60 is utilized to trigger inhibit gate 52 to its closed position and is suitably chosen to have a duration covering the video blanking period.

Camera counter stage 54 and cathode ray tube counter stage 50, respectively, accordingly provide two digital counts, viz., camera and cathode ray tube beam positions in horizontal planes. These counts are instantly compared in a digital comparator stage. If such comparison shows that the receiver binary count exceeds the camera binary count, then an error signal of one polarity is generated and if the comparison shows that the camera binary count exceeds the receiver binary count, then, an error signal of the opposite polarity is generated, such error signal outputs suitably being generated by the combination add-subtract-correction circuits responsive to the output of digital comparator 62. The polarized error signals respectively represent a difference between the positions of the camera and receiver beams.

The system shown in FIGS. 1 to 3 may be utilized to provide vertical precision in the full raster height or to a given percentage of the full raster height.

Thus, the system can be utilized, for example, to provide an image confined to an amount such as 11% of the raster height and may be made to appear at a given portion of the receiver cathode-ray tube.

Thus, with the embodiment of the inventive system shown in FIGS. 1 to 3, visual images can be chosen to appear above the center of the screen of cathode-ray tube 40 and can be confined to an area limited to about 11 percent of the raster height, for example. If it is assumed that about 11 percent of the vertical plane represents about 27 horizontal lines per field on the receiver cathode-ray tube, and the image area is chosen to extend from line 105 to line 133 thereof, then, in accordance with the invention, precise control need only be provided during the period that the beam of cathode-ray tube 40 scans from line 105 to line 133. An additional varying of precise control is preferably provided above and below the image area to take any transients which may occur into consideration. Thus, precise control may suitably be provided in such situation by controlling during the period that the beam of cathode ray tube 40 scans from line 96 to line 152.

To effect the latter control, a vertical ramp produced by the stage 30 in camera control unit 26 legended sweep is applied to a vertical deflection amplifier 64 through a vertical buffer stage 66, the output of vertical deflection amplifier 64 being applied to the deflection coils of cathode-ray tube 40. From vertical deflection amplifier 64, there is also produced a vertical retrace blanking pulse which is applied to a monostable multivibrator 72 legended one-shot reset through a shaper stage 68 and a monostable multivibrator 70 lengended one-shot. Shaper stage 68 operates to convert the vertical retrace blanking pulse to a rectangular form and monostable multivibrator 70 imparts a given delay to the triggering of vertical reset monostable multivibrator 72.

The output of stage 72 is amplified in a reset amplifier 74, the output of amplifier 74 being applied to a line counter. Line counter 76 may suitably be a binary counter which can provide a count at least equal to the highest number line being controlled. Thus, if the visual image area being controlled comprises that included between lines 96 to 152, then line counter 76 can suitably comprise eight flip-flops to enable a count of 256 in one cycling of the counter. The output of reset amplifier 74 restores the flip-flops of counter 76 to the reset state, i.e., to the zero condition.

It is recalled that the output of digital comparator 62 is an error signal polarized according to which count is higher in either the camera counter 54 or cathode-ray tube counter stages. This error output is applied through inhibit gates 78 and 80 and through a correction output stage 82 which contains the add-subtract-correction circuits to the horizontal deflection amplifier 84. As is seen in FIGS. 1 to 3, horizontal deflection amplifier 84 also has applied as an input thereto, the horizontal ramp output from the sweep stage 30 in camera control unit 30, the amplified horizontal ramp also being applied to the deflection coils in cathode-ray tube 40.

It is noted that the output of line counter stage 76 is applied as an input to a control flip-flop and as one input to an OR gate 88, the other input to OR gate 88 being the output of reset amplifier 74. Thus, upon either the application of the reset output of line counter 76 or the output of reset amplifier 74 to OR gate 88, flip-flop 86 is switched to its reset state. The output of flip-flop 86 is applied as the other input to inhibit gates 78 and 80 respecively. As will be further shown hereinbelow, the application of the reset output of control flip-flop 86 to inhibit gates 77 to 80 enables these gates to prevent the output of digital comparator from being applied as correction to the H ramp in horizontal deflection amplifier 84.

The set input to line counter 76 is provided from the output of the horizontal blanking trigger signal shaper 56 to initiate its cycling, counter 76 cycling at a rate in synchronism with line scanning. If it is assumed that it is desired to precisely control the visual area covered by lines 96 to 152, when a count of 96 is attained in counter 76 indicating that the beam of cathode-ray tube 40 is at the line 96 position, counter 76 is so arranged that at this point a set output is attained from the 25 and 26 flip-flops therein. The latter output functions to switch control flip-flop stage 86 to its set state whereby inhibit gates 78 and 80 are opened to permit the correction of the H ramp in horizontal deflection amplifier 86 and precise control of the H ramp is initiated. Now, when the count of 152 is attained in line counter 76, counter 76 is so arranged whereby the reset output of flip-flops 23, 24 and 27 therein together with the output of reset amplifier 74 through OR gate 88, switches flip-flop 86 to its reset state. Consequently, at this time, inhibit gates 78 and 80 are enabled to cut off the application of the correction output from digital comparator 62 to horizontal deflection amplifier 84 and precise control of the H ramp is removed at this point.

Horizontal deflection amplifier 84 is suitably driven as a current feedback system with an input signal derived from the deflection yoke current of camera 22. This input signal, i.e., the H ramp signal is compared with the receiver yoke horizontal deflection amplifier 84. The latter amplifier suitably is a high-gain horizontal deflection power amplifier and is arranged to have a summing junction at it input where the input H ramp signal is compared with the deflection yoke current in cathode-ray tube 40. Such comparison forces the yoke current in cathode-ray tube 40 to follow the yoke current in camera 22 whereby any current nonlinearities are basically compensated for. The horizontal position error signal is utilized to correct the horizontal deflection yoke current for precise position registration.

The time of occurrence of the leading edge of horizontal blanking trigger signal from stage 32 in camera control unit 26 is chosen to coincide with the ending of a horizontal line scan. Consequently, such signal is utilized to switch the flip-flops in horizontal line counter 76 to their set state. Such switching is accomplished by applying the horizontal blanking trigger signal to horizontal line counter 76 through shaper stage 56. The horizontal blanking trigger signal is also applied to monostable multivibrator 58 through shaper 56, the consequently delayed output of the monostable multivibrator contained in one-shot delay stage 58 being utilized to trigger the monostable multivibrator contained in one-shot inhibit and blank stage 60. The delayed output of the latter multivibrator is applied through video separator stage 34 and through video amplifier 38 to cathode-ray tube 40 to blank the latter tube during horizontal retrace.

The delayed output of the monostable multivibrator contained in one-shot inhibit and blank stage 60 is also applied to a monostable multivibrator contained in a one-shot delay stage 90 and to inhibit gate 52 to provide an inhibit signal thereto of a chosen duration which prevents the application of registration grid pulses for such duration to camera counter 54. The delayed output of the monostable multivibrator contained in one-shot delay stage 90 is applied to a monostable multivibrator contained in a one-shot reset stage 92, the output of the latter stage being applied as a reset input to camera counter 54 and cathode-ray tube counter 50 to reset the latter counters.

There follows hereinbelow, a description of illustrative examples of circuits which may be utilized in the stages depicted in FIGS. 1 to 3.

HORIZONTAL DEFLECTION AMPLIFIER

Figures 4, 6:
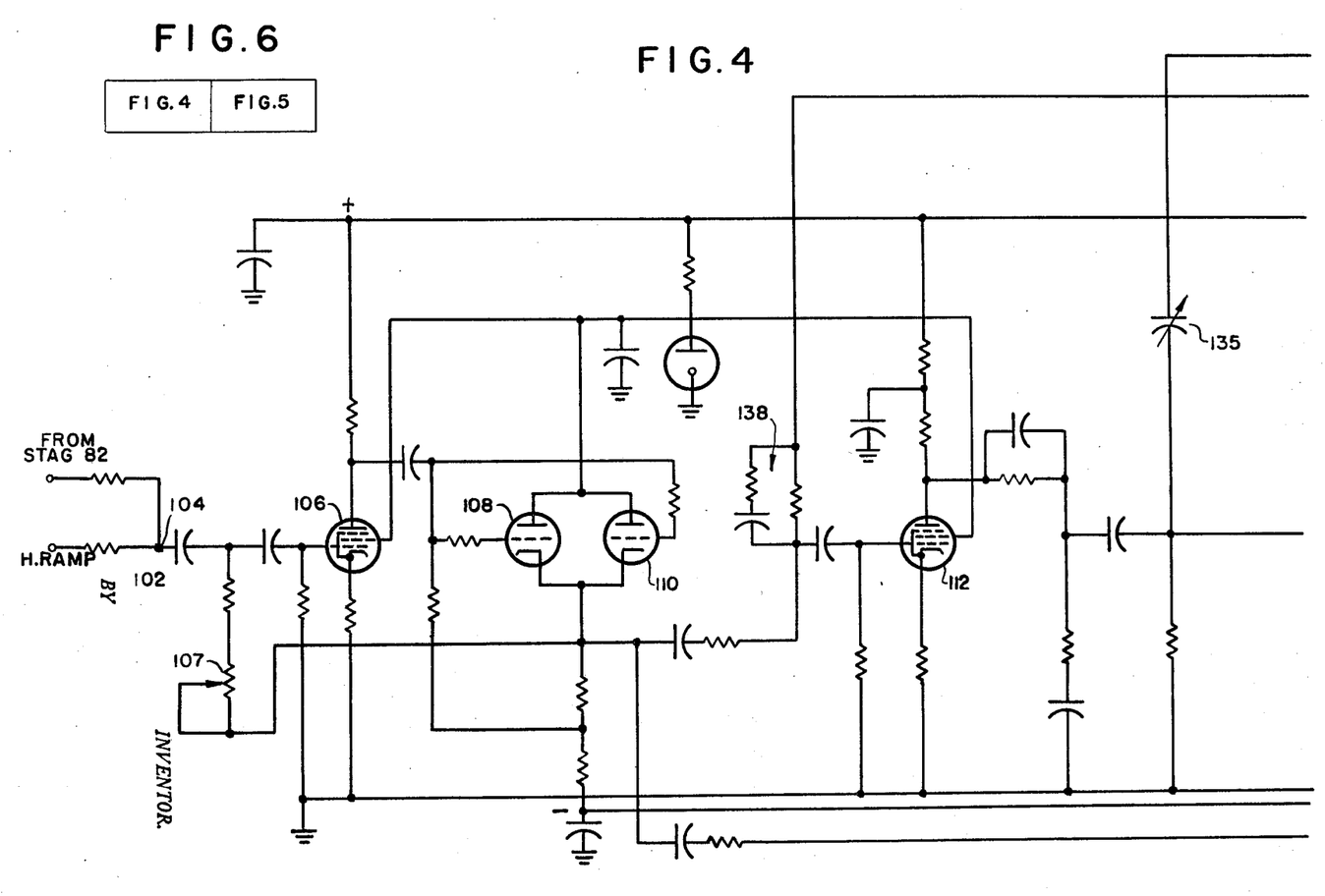
FIGS. 4 and 5, taken together as in FIG. 6, form a schematic diagram of a circuit suitable for use as the horizontal deflection amplifier in the system of FIGS. 1, to 3.
Figure 5:
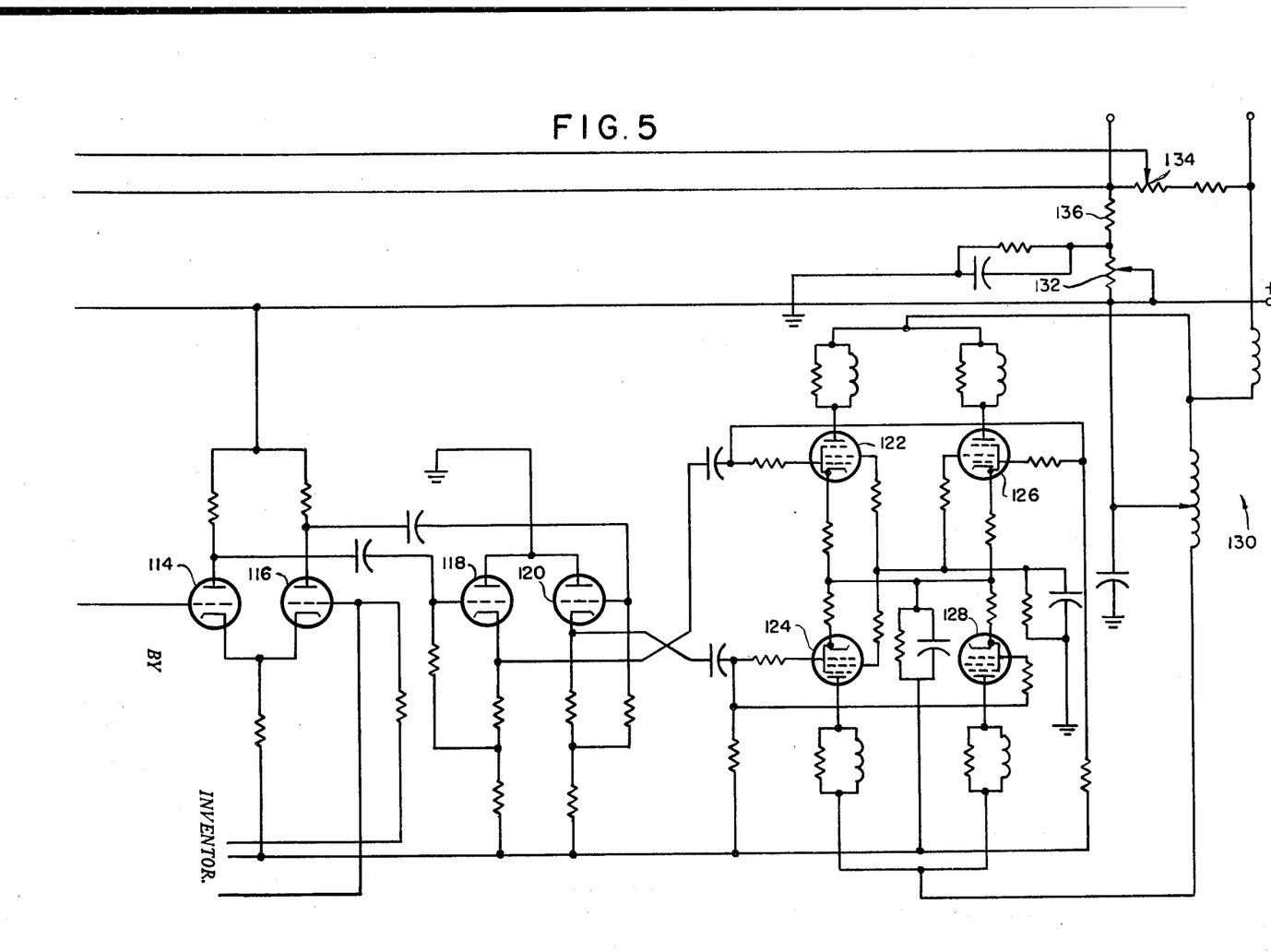

In FIGS. 4–6, there is shown a circuit suitable for use as horizontal deflection amplifier stage 84 shown in FIGS. 1 to 3. As shown in FIGS. 1 to 3, stage 84 receives inputs respectively from sweep stage 40 of camera control unit 26, from correction output stage 82 and from cathode-ray tube 40. It provides an output to the deflection yoke of cathode-ray tube 40 whereby the horizontal position of cathode-ray tube 40 is maintained in registration with the beam of camera 22.

Referring now to FIGS. 4 to 6, the horizontal ramp, i.e., the horizontal sawtooth wave provided from camera 22 through sweep stage 30 is applied to the summing junction 104 input of the amplifier through a resistor 102, the output of correction output stage 82 also being applied to junction 104. It is to be realized that, since in the horizontal plane, the target area for the visual image may cover as much as 80 percent of a line, and that, since deflection current at the end of a line may be appreciable, the control inherently provided by the sawtooth waveform of the sweep current by itself is not sufficient to maintain registration between the cathode-ray tube beam and the camera beam at the desired degree of preciseness. Consequently, it is necessary to continually correct the horizontal ramp input by summing it with the horizontal error voltage produced at the output of correction output stage 82 at junction 104 to maintain such registration.

Pentode vacuum tube 106 and its associated circuit elements constitute an amplifier which amplifies the input appearing at junction 104. The amplified output appearing at the plate of tube 106 is applied as an input to vacuum tube triodes 108 and 110 which together with their associated circuit components comprise a cathode follower which functions to current amplify the output of tube 106 and to provide isolation. The output of cathode follower tubes 108 and 110 is applied as an input to a vacuum tube pentode 112 which together with its associated circuit elements constitutes an amplifier wherein the output of tubes 108 and 110 is amplified. The output of cathode follower tubes 108 and 110 is also applied as an input to a vacuum tube triode 116. With the output of tube 112 being applied as an input to a vacuum tube triode 114, it is seen that tubes 114 and 116 together with their associated circuit elements function as a phase splitter.

A portion of the output of cathode follower tubes 108 and 110 is also fed back to the control grid of amplifier tube 106 through a potentiometer 107 which is the horizontal size control potentiometer, potentiometer 107 enabling the adjustment of the amplitude of the horizontal output applied to the deflection yoke of receiver cathode-ray tube 40.

The output of phase splitter tube 114 is applied as an input to a vacuum tube triode 118 and the output of phase splitter tube 116 is applied as an input to a vacuum tube triode 120. Tubes 118 and 120 are connected with their associated circuit elements to operate as cathode follower stages which provide current amplification and isolation, the output of cathode follower tube 118 being applied as an input to vacuum tube pentodes 122 and 126 respectively, and the output of cathode follower tube 120 being applied as an input to vacuum tube pentodes 124 and 128. Tubes 122, 124, 126 and 128 together with their associated circuit elements comprise a push-pull parallel output circuit, the output of the latter circuit being applied to the horizontal deflection yoke of receiver cathode ray tube 40 through a transformer.

A potentiometer 132, located in the output circuit, functions as a horizontal centering control and operates to adjust the level of direct current bias through the horizontal deflection yoke of tube 40 for centering its raster. A variable resistor 134 enables the providing therefrom of a feedback voltage to tube 114 for enabling continuous rate correction, a variable capacitor 135 connected in this feedback circuit also enabling phase correction. The rate and phase correction controls enables the adjustment of the amplitude and phase of the feedback voltage provided from resistor 134 and which is derived from the horizontal deflection yoke current together with the rate of change of the horizontal deflection yoke current. Current feedback from potentiometer 132 through resistor 135 and circuit combination 138 is utilized as the basic driving signal of the system.

VERTICAL DEFLECTION AMPLIFIER

The vertical deflection amplifier stage 64 in FIGS. 1 to 3 provides a current to the vertical deflection yoke of receiver cathode-ray tube 40 whereby the vertical position of the cathode-ray tube beam is maintained in registration with the beam of camera 22 and is accomplished by utilizing the vertical yoke current of camera 22 to effect a voltage drop across a resistor in the camera vertical deflection yoke circuit. Such voltage drop is shown in FIGS. 1 to 3 as being produced at the output of sweep stage 30 in camera control unit 26.

This voltage drop is applied to vertical buffer stage 66 which may suitably be a two-stage dual triode amplifier in which the output of the first stage is coupled to the cathode of the second stage. The vertical ramp voltage is taken from the plate of the output stage and applied as an input to the vertical deflection amplifier stage 64.

It is recalled that in the horizontal deflection amplifier, both sweep current and digital control are employed for effecting accurate registration of the beams of camera 22 and cathode-ray tube 40. However, in the vertical deflection amplifier stage only current control need be utilized. This can be understood if it is realized that whereas in the horizontal plane, the visual image area may cover up to 80 percent of the field and deflection current is appreciable at the outer edges of the field thereby requiring digital control for horizontal registration, in the vertical plane in accordance with the invention, the field coverage is only up to about 11 percent. Consequently, vertical deflection current at the edges of the vertical field is quite low and registration of the beams of the camera and the cathode-ray tube can be maintained using only sweep current control.

Figure 7:
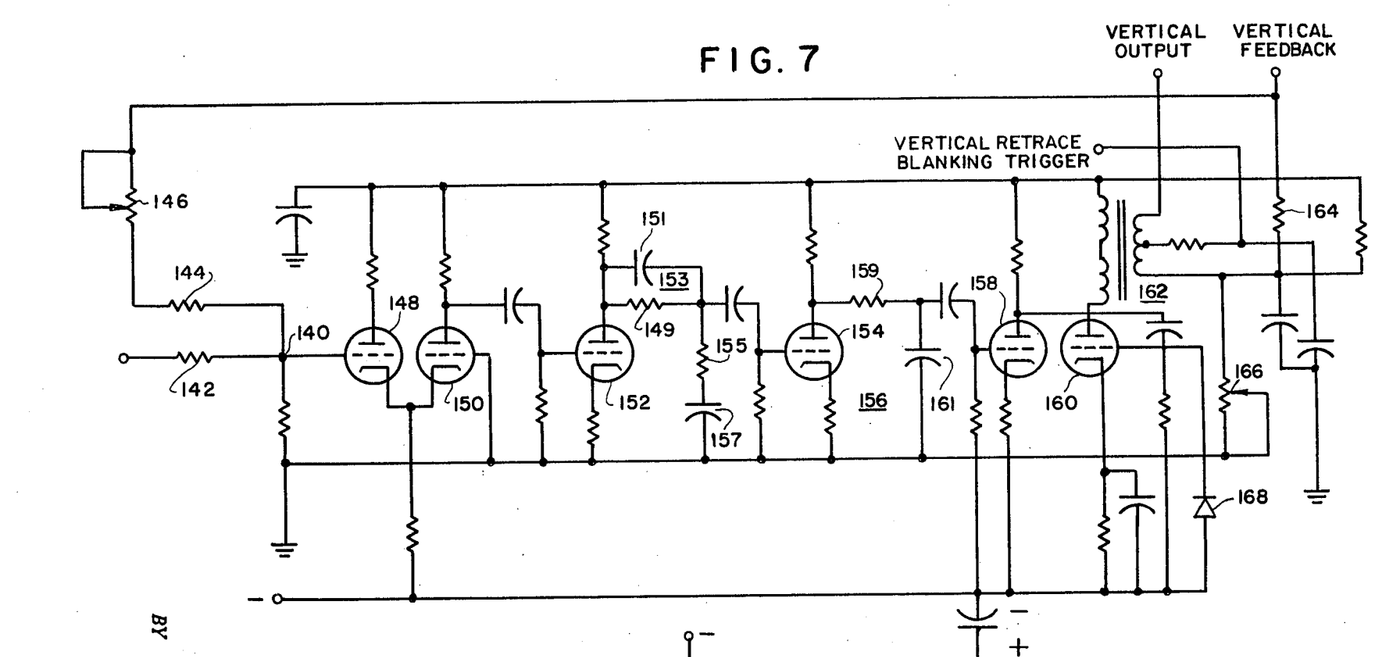
FIG. 7 is a schematic depiction of a circuit suitable for use as the horizontal deflection amplifier in the system of FIGS. 1 to 3.

As shown in FIG. 7, the vertical ramp sawtooth voltage output from vertical buffer 66 (FIGS. 1 to 3) is applied to a summing junction input 140 of vertical deflection amplifier through a resistor 142. Also applied to junction 140 through a resistor 144, and a variable resistor 146, is a vertical feedback signal provided from cathode-ray tube 40.

The first stage of the vertical deflection amplifier comprises a two-stage triode input amplifier comprising triodes 148 and 150; the output of triode 148 being cathode coupled to triode 150. The amplifier vertical ramp voltage is applied to an amplifier comprising a triode tube 152 and associated circuit elements. The amplified output of tube 152 is applied as an input to an amplifier comprising a triode 154 and associated circuit elements through a lead network 153 comprising the parallel combination of resistor 149 and a capacitor 151, and is developed across the parallel connected series combination of resistor 155 and a capacitor 157. The lead network operates to stabilize the feedback loop in the amplifier by decreasing the slope of its frequency response curve at the low frequency end.

The output appearing at the plate of tube 154 is applied to an amplifier which comprise a triode tube 158 and its associated circuit elements through a log network 156 comprising a series connected resistor 159 and a parallel connected capacitor 161, the log network operating to stabilize the feedback loop in the amplifier by decreasing the slope of its frequency curve at the high frequency end. The output appearing at the plate of triode 158 is applied to an amplifier comprising a tube 160 and associated circuit elements; the output appearing at the plate of tube 160 being applied to the vertical deflection yoke of cathode-ray tube 40 through a transformer 162.

The feedback voltage applied to summing junction 140 is developed across a resistor 164 in the yoke current of receiver cathode-ray tube 40. The feedback forces the receiver cathode-ray tube deflection current to follow the camera deflection current to accomplish precise registration. The potentiometer, i.e., variable resistor 146, in the feedback circuit is the vertical size controller for adjusting the final output level of the deflection current. A potentiometer 166 located in receiver cathode-ray tube 40 enables the adjustment of the level of the bias direct current through the cathode-ray tube yoke for vertically centering its raster. A diode 168 functions to negatively clamp the input to the control grid of tube 160 to the value of the negative voltage source.

VIDEO SEPARATOR

As has been stated hereinabove, the function of video separator stage 34 in FIGS. 1 to 3 is to separate the combination video signal from camera 22 into image video information and registration and pulses. The image video information is then applied to video amplifier 38 and the registration and pulses are applied to camera counter 54 through inhibit gate 62.

Figure 8:
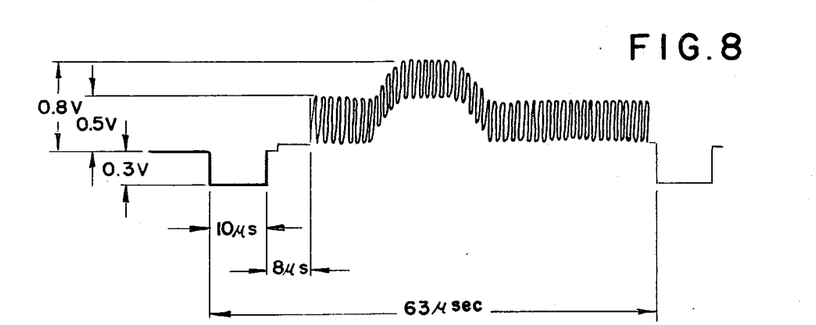
FIG. 8 is a depiction of the composite signal produced from the camera control unit of the system of FIGS. 1 to 3.

FIG. 8 shows the waveform of the combined video signal output from video stage 28. This output is applied to video separator stage 34, a block diagram of a suitable embodiment of stage 34 being shown in FIG. 9.

Figure 9:
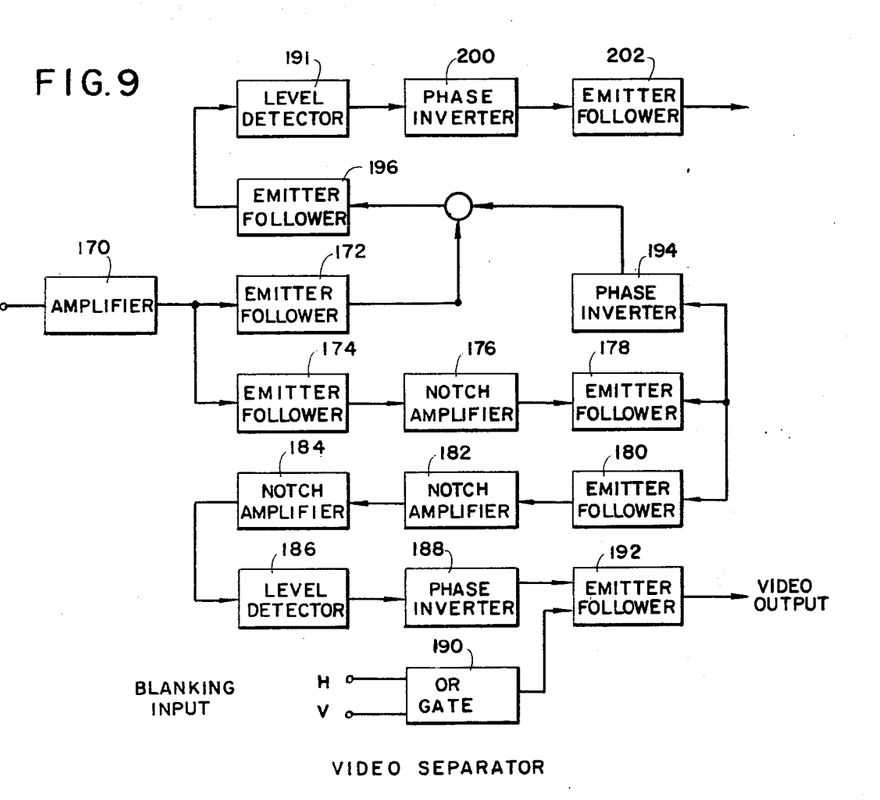
FIG. 9 is a block diagram of a circuit suitable for use as the video separator stage in the system of FIGS. 1 to 3.

As shown in FIG. 9, the output of video stage 28 is applied to an amplifier 170, the amplifier output of amp NO being applied to emitter followers 172 and 174. Emitter follower 172 provides the input to the registration pulse output channel and emitter follower 174 provides the input to the target video output channel.

IMAGE VIDEO CHANNEL

As a suitable registration grid pulse waveform there may be utilized one which can be expressed as a Fourier series containing as major components the terms $$E = E_1 \sin w_1 t + E_2 \sin w_2 t + E_4 \sin w_4 t$$

wherein $w_1$ may suitably be equal to 1.1 mc., $w_2$ may be 2.2 mc. and $w_4$ may be 4.4 mc. To obtain an output containing only image video information, the aforesaid major components comprising the registration grid pulse waveform to be removed from the combined video signal output. This is achieved in the target video output channel by applying the output of emitter follower 174 to 1.1 mc. notch amplifier 176, whose output is, in turn, applied through emitter followers 178 and 180; the output of emitter follower 180 consisting of the combined output from video stage 28 with the component represented by the first term of the above set forth Fourier expression removed therefrom. The output from emitter follower 180 is applied to a notch amplifier 182 in which the component represented by the second term of the Fourier expression is removed therefrom. In notch amplifier 184, the component represented by the last term of the Fourier expression is removed, whereby the output of amplifier 184 essentially comprises only the target video information.

The output of amplifier 184 is applied to a level detector stage 186, which output is inverted in a phase inverter 188. At the output of inverter 188, a summing function is employed, at which point, the horizontal and/or the vertical blanking pulses passed through an OR gate 190 are added to the target video signal. The combined image video and blanking pulses are applied to an emitter follower 192; the output of emitter follower 192 being applied to the receiver video amplifier 38 (FIGS. 1 to 3).

REGISTRATION GRID PULSE OUTPUT CHANNEL

Figure 10:
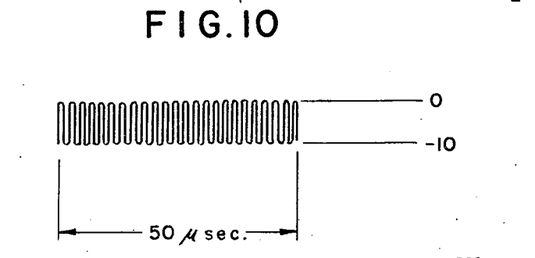
FIG. 10 is the wave form of the registration grid pulse output of the video separator and the photomultiplier.

In the channel, the image video information is removed from the combined video signal, whereby there remains a train of registration grid pulses. To effect this operation, the output of emitter follower 178 which is the combined video signal with the component represented by the first term in the Fourier expression; i.e., the 1.1 mc. component removed therefrom, is inverted in a phase inverter 194. In this connection, it is to be appreciated that the 1.1 mc. fundamental component is the largest amplitude component of the registration grid pulse waveform. Consequently, after such component is removed therefrom by notch amplifier 176, the remaining waveform effectively consists only of image video information. The output from phase emitter 194 is summed with the combined video ming junction input to an emitter follower 172 at a summing junction input to an emitter follower 196, whereby at the output of emitter follower 196 there is produced the component represented by the first term of the Fourier expression; i.e., the 1.1 mc. pulse component. The output of emitter follower 196 is applied to a level detector 198 whose output is inverted by a phase inverter 200. The output from inverter 200 is applied to an emitter follower 202, whose output is a train of pulses, as is shown in FIG. 10, having a pulse repetition frequency of 1.1 mc. and an amplitude, suitably, from −10 to 0 volts. Such pulse train is applied to camera counter 54 through inhibit gate 52 (FIG. 1).

VIDEO AMPLIFIER

Figure 11:
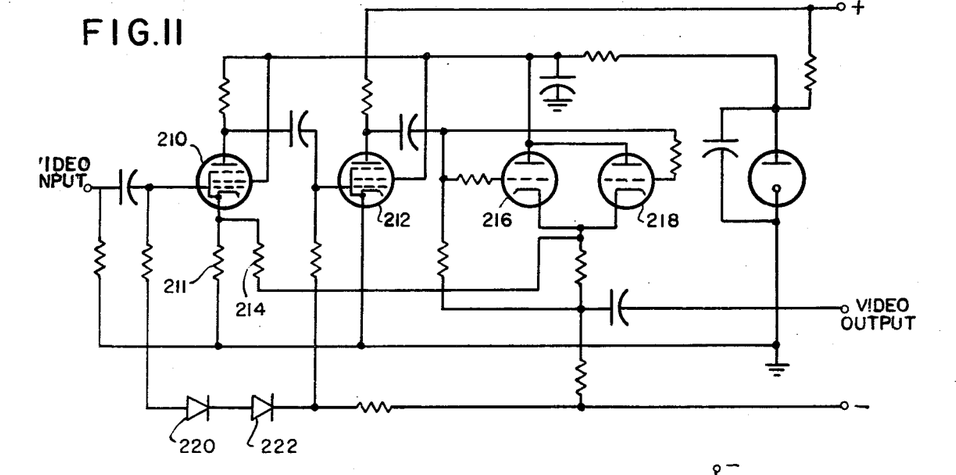
FIG. 11 is a schematic diagram of a circuit suitable for use as the video amplifier in the system of FIGS. 1 to 3.

In FIG. 11 there is shown a circuit suitable for use as the video amplifier 38 in the system of FIGS. 1–3.

The input to the circuit comprises the output from emitter follower 182 (FIGS. 8–9) of the video separator stage and is composed of image silhouette plus retrace blanking signals. This input is applied to an amplifier stage comprising a pentode vacuum tube 210, and its associated circuit elements. The output of this stage is applied to a succeeding amplifier stage comprising a pentode 212, and its associated circuit elements. The output from the latter stage is applied as an imprint to both triodes 216 and 218, of a cathode follower stage; the output of the cathode follower stage being applied to the receiver tube 40 (FIG. 1).

Feedback from the cathode follower stage is applied to the cathode resistor 211 in the first amplifier stage through a resistor 214; such feedback being employed to stabilize the gain of the amplifier and to maintain the proper black and white level in the receiver cathode-ray tube 40 (FIG. 1). Cathode bias is employed in the first amplifier stage and the output cathode follower stage. Fixed grid bias is provided in the second amplifier stage by the use of a pair of stabistors, 220 and 222.

PHOTOMULTIPLIER PULSE SHAPER

Figure 12:
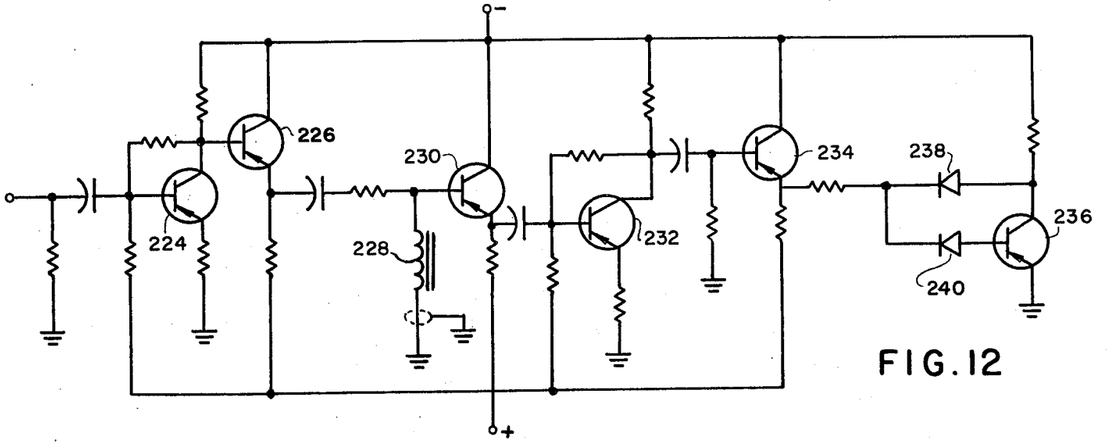
FIG. 12 is a schematic depiction of a circuit suitable for use as a photomultiplier pulse shaper in the system of FIGS. 1 to 3.

In FIG. 12 there is shown a circuit which may suitably be employed as the photomultiplier pulse-shaper 48 in the system of FIGS. 1–3.

In this circuit, photomultiplier output pulses are applied as an input thereto from emitter follower 46 (FIGS. 1–3), suitably through a terminated co-axial cable. The circuit essentially comprises an amplifier stage which includes transistors 224 and 226 and their associated circuit components. The output of this amplifier stage is applied to a shorted-end delay line 228 suitably having a 0.1 microsecond delay; delay line 282 functioning as a discrete level differentiator to eliminate the DC component in the input to the circuit. Delay line 228 effects a differentiation of the photomultiplier pulses whereby each positive spike appearing at the base of transistor 230 represents the leading edge of a photomultiplier pulse which in turn, represents information as to the horizontal position of the cathode ray beam in receiver tube 40 (FIGS. 1–3). Transistor 230 and 232 and their associated circuit elements comprise a second amplifier stage, and transistors 234 and 236 and their associated circuit components together with diodes 238 and 240 comprise a level detector whose output pulses are of a chosen amplitude suitably 0 to minus 10 volts.

HORIZONTAL ERROR CORRECTION AND DIGITAL COMPARATOR OPERATION

The function of digital comparator 62, in FIGS. 1 to 3, is to provide a horizontal error signal to the input of horizontal deflection amplifier 84. Such error signal when summed with the H ramp signal from camera control unit 26 and the horizontal sweep current feedback from cathode-ray receiver tube 40, effects a correction in the H ramp whereby the cathode-ray beams of camera tube 22 and receiver tube 40 are maintained in registration. Such correction is accomplished by digitally comparing registration grid pulses from photomultiplier 44 in the background projector; i.e., the pulse from PM shaper 48 with registration grid pulses from camera 22; i.e., the pulse output from video separator 34. As has been described hereinabove, video separator 34 functions to separate video information from registration grid pulses in the combined video signal output from camera control, unit 26. As has also been explained hereinabove, the output of photomultiplier 44 is a train of pulses generated by the cathode-ray beam of receiver tube 40 as it traverses a registration grid; such pulses being applied to photomultiplier pulse shaper 48.

Inhibit gate 52 to which the camera registration grid pulses are applied permits pulses to be passed there through only during an active line and not during horizontal retrace; an active line with the contemplation of a design application of the circuit of FIGS. 1 to 3 being 50 registration grid pulses.

Figure 13:
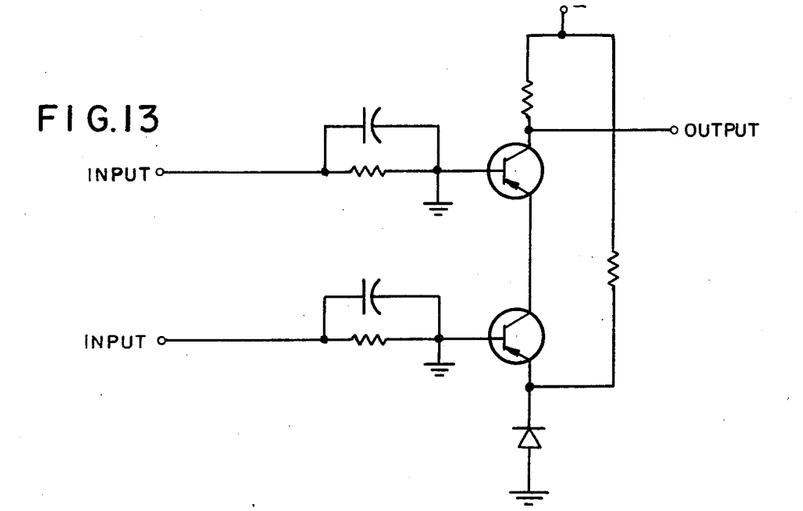
FIG. 13 is a schematic diagram of a suitable inhibit gate.

In FIG. 13 there is shown a circuit suitable for use as inhibit gate 52 in the system of FIGS. 1 to 3. In this circuit the transistor means are so arranged whereby they normally are non-conductive and an output is produced therefrom only when the bases of the transistors have simultaneously, respectively applied thereto a negative voltage. Such enabling of the inhibit gate occurs when the registration grid pulses from video separator 34, which may suitably be from 0 to minus 10 volts, and the negative astable output from one-shot delays 60 and simultaneously applied to inhibit gate 52.

Figure 14:
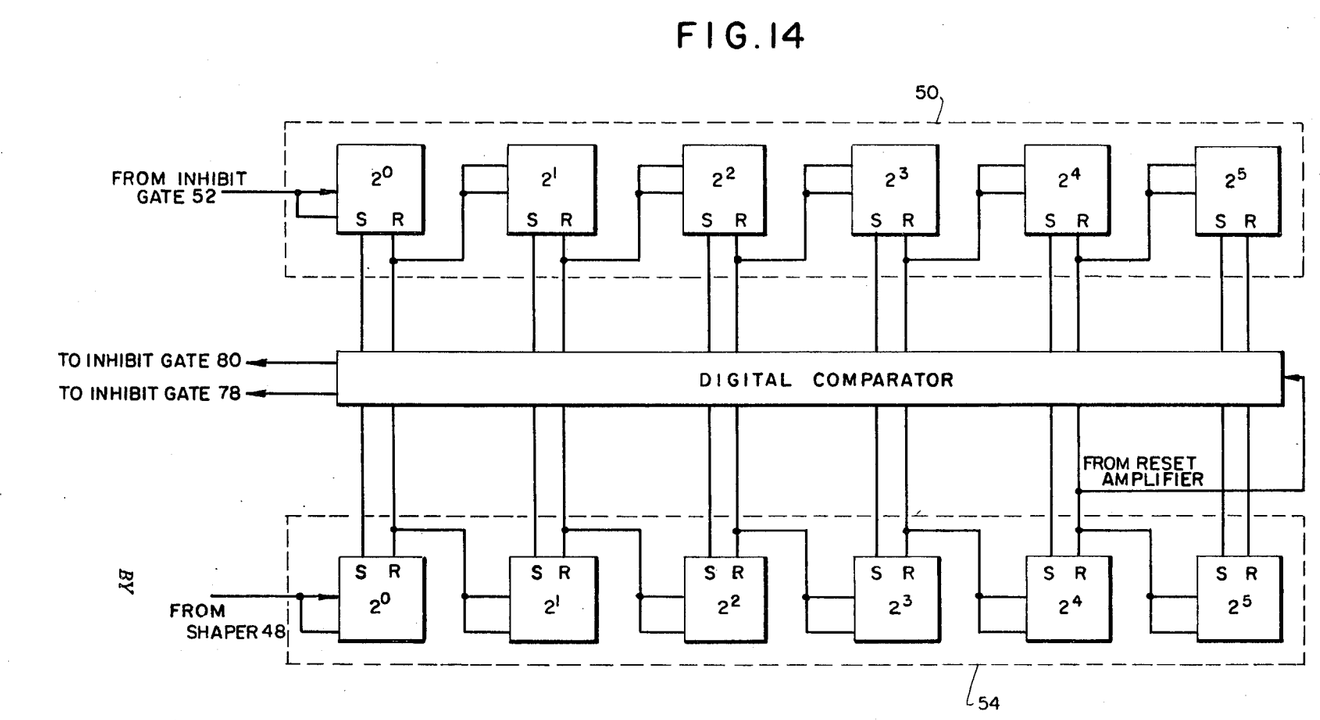
FIG. 14 is a block diagram of the digital comparison arrangement in the system shown in FIGS. 1 to 3.

The output of inhibit gate 52 is applied to camera counter 54 which may suitably be a binary counter comprising six serially connected flip-flops, thereby enabling a count of 64 during a cycling thereof and a summation therein of 63. The CRT counter 50 may be the same type of counter as camera counter 54. FIG. 14 shows an arrangement of counters 54 and 50, and digital comparator 62.

In the operation of a counter in the arrangement of FIG. 14, if it is assumed that all of the flip-flops of counter 54, for example, are in their zero binary states, the first pulse triggers the $2^0$ flip-flop therein to the binary one state. The next pulse triggers the $2^0$ flip-flop back to the zero state and this reset action triggers the $2^1$ flip-flop to the one state. The $2^1$ flip-flop now remains in the one state until the next second pulse; i.e., when the $2^0$ flip-flop is switched back to its zero state from the one state. Thus, the cycling continued. Since an active line contains only 50 pulses, such count is arrived at when the $2^1$, $2^4$ and $2^5$ flip-flops are filled. The set, i.e., binary one state of a flip-flop, may suitably be zero volt at its set output terminal and minus ten volts at its reset output terminal. The complement of these values obtain when a flip-flop is in its reset state.

The output voltage appearing at the set and reset; i.e., S and R terminals, of the flip-flops of the counters 50 and 54, are compared in digital comparator 62. An output voltage (minus 10 volts) will be produced from comparator 62 only when the flip-flops of the same order are in opposite states, the latter condition representing a difference, i.e., lag or lead between the horizontal position of the cathode-ray beams, respectively, of camera 22 and receiver tube 40.

Figure 15:
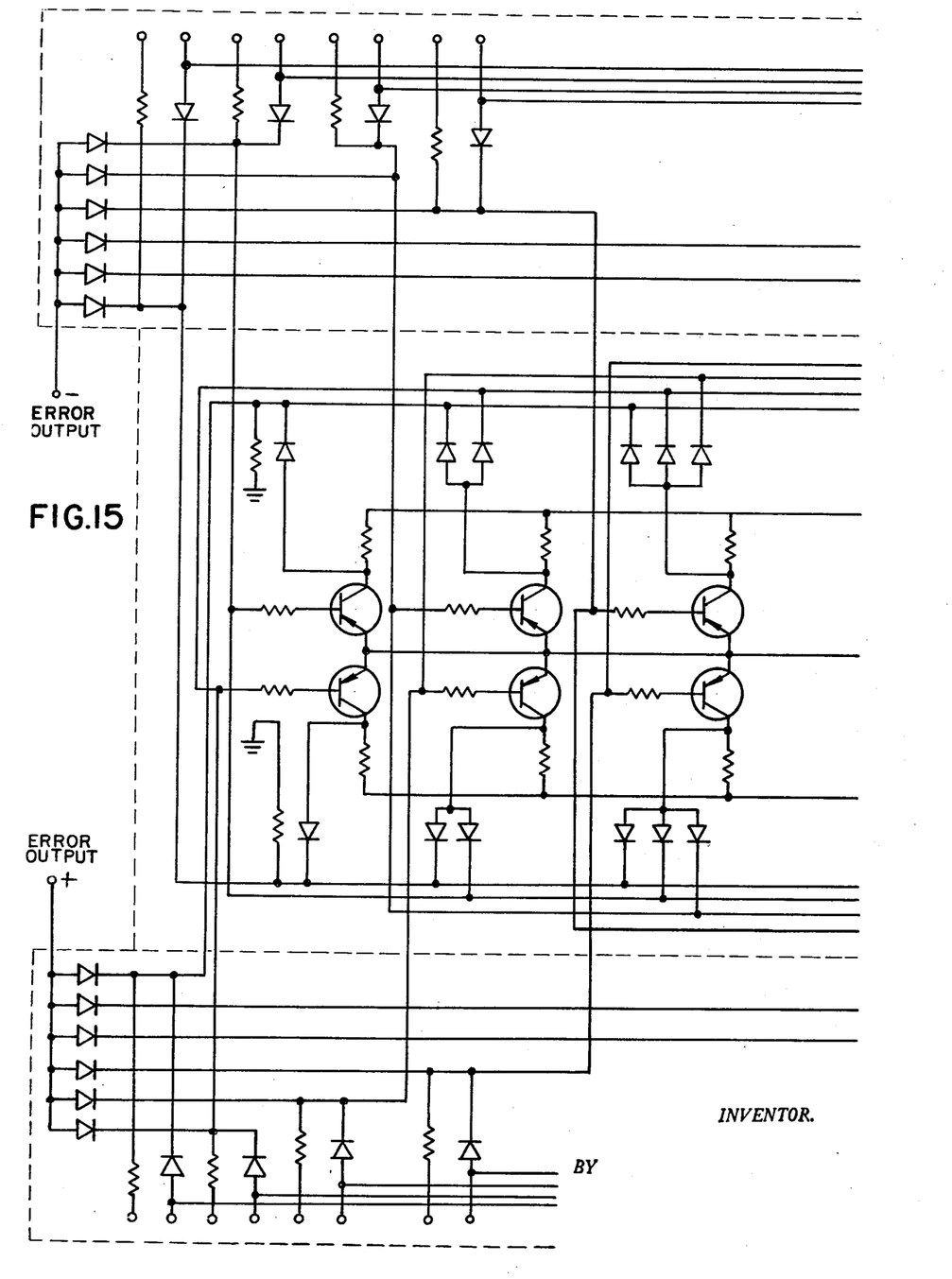
FIGS. 15 and 16, taken together as FIG. 17, is a schematic diagram of a digital comparator suitable for use in the embodiment shown in FIGS. 1 to 3 and in the arrangement shown in FIG. 14.
Figures 16, 17:
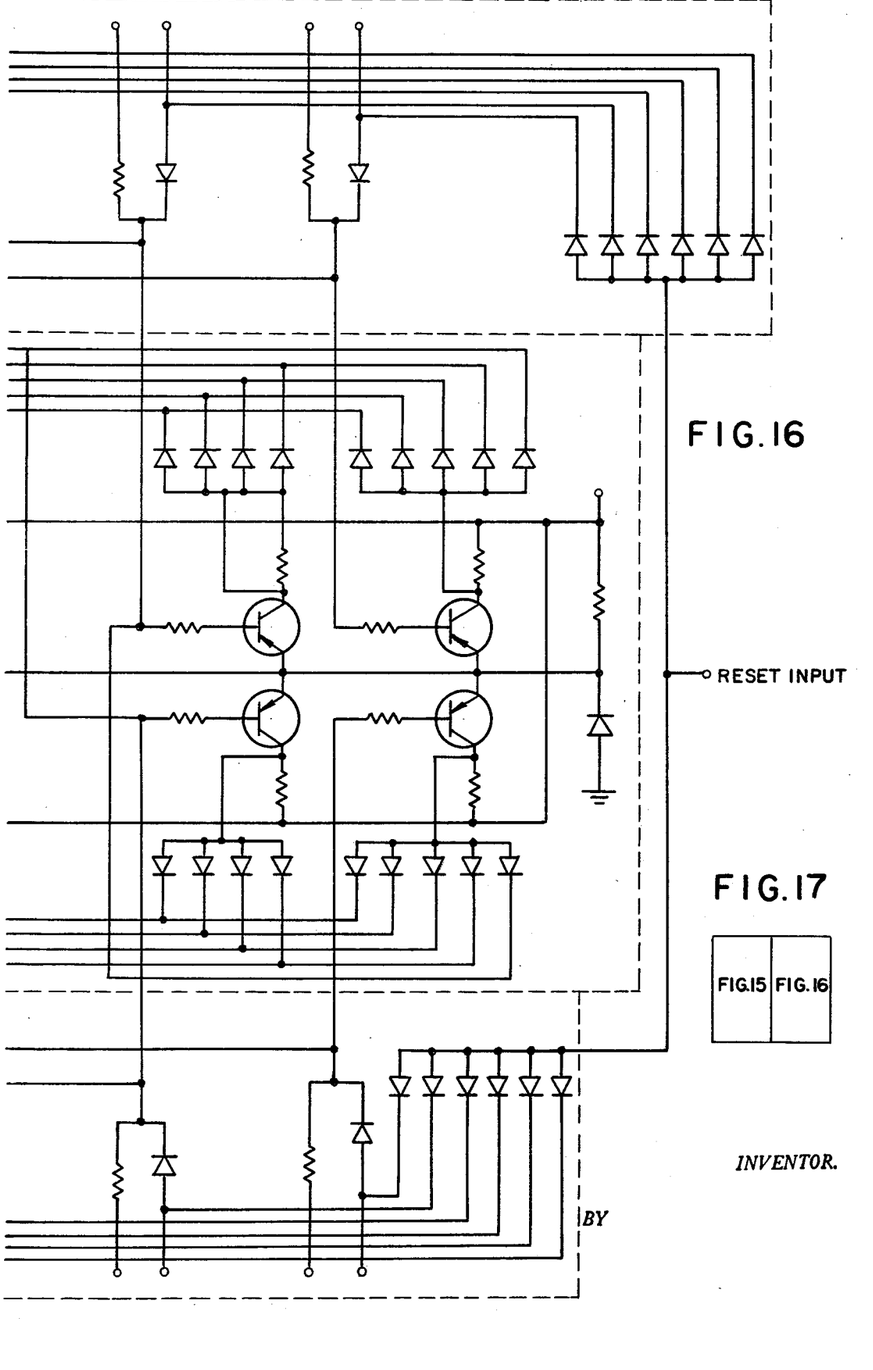

In FIGS. 15 to 17 there is shown a circuit suitable for use as the digital comparator 62 in the systems of FIGS. 1 to 3. When a lag or lead condition exists between the horizontal position of the cathode-ray beams of camera 22 and tube 40, the output from the highest order comparison stage triggers a transistor so that it collector-to-emitter voltage drops to zero and also causes the collector-to-emitter voltage of the lower order comparison stage output to drop to zero and also causes the collector-to-emitter voltage of the lower order comparison stage output to drop to zero. Consequently, a minus 10 volts output is produced at the output of comparator 62. Such minus 10 volts output can appear on either of the output lines of the comparator, depending upon whether there is a lag or lead of the receiver tube cathode-ray beams with relation to the cathode-ray beam of the camera, and the tube beam being slaved to the camera beam.

Figure 18:
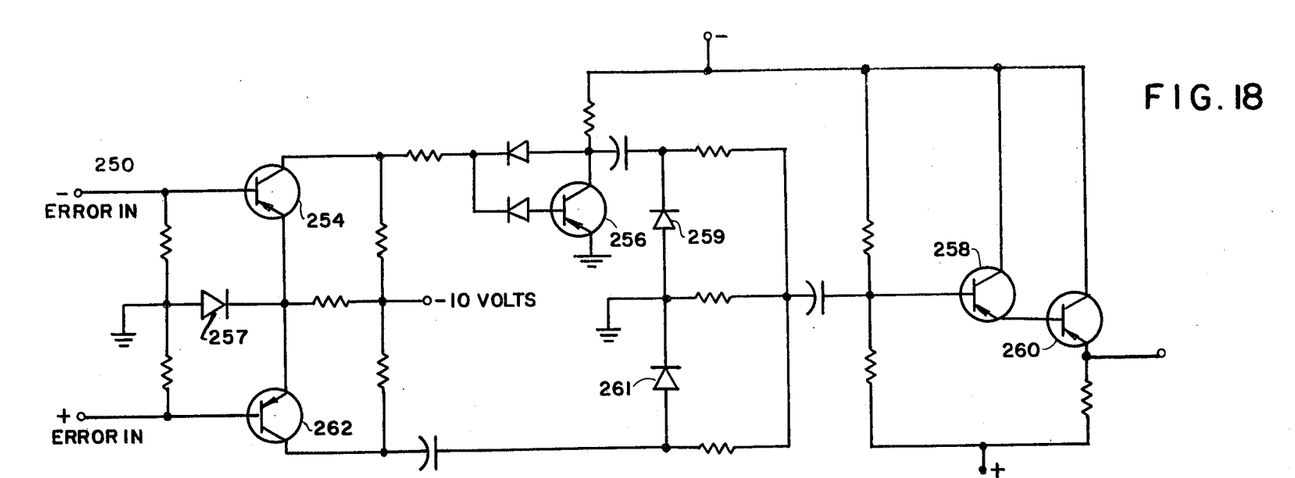
FIG. 18 is a schematic depiction of a circuit suitable for use as the correction output stage in the system shown in FIGS. 1 to 3.

FIG. 18 shows a circuit suitable for use as the correction output stage 82 of the systems of FIGS. 1 to 3. Leads 250 and 252 therein have applied thereto the minus or plus; i.e., the lead or lag signals produced by the relationship of the receiver tube beam with respect to the camera beam. When the receiver tube beam leads the camera beam, a minus 10 to zero pulse is applied to transistor 254, whereby its output causes the cutting of normally conductive transistor 256, thereby producing a zero to minus 10 volts output from transistor 256, diodes 257 and 259 functioning to positively clamp this output to ground. The clamped negative output pulse is attenuated, suitably 10 to 1, and applied to a dual emitter follower comprising transistors 258 and 260. The output at transistor 260 is the horizontal error voltage applied as input to horizontal deflection amplifier 84. When the receiver cathode-ray tube beam leads the camera beam, the output of the correction circuit is a negative level whereby a negative correction is applied to the positive going H ramp at the input to horizontal deflection amplifier 84.

When the cathode-ray beam of tube 40 lags, the beam of camera 22, the highest order comparisons stage of comparator 62, causes the application of a minus 10 volts level to the plus output line; i.e., line 252. This voltage triggers into conductivity the normally cut off transistor 262 to produce a minus 10 volts output at the collector of transistor 262, such output being negatively clamped to ground by diode 261, thereby producing a zero to plus 10 voltage output. This output is attenuated 10 to 1 and appears as a zero to plus 1 volt output to the dual emitter follower comprising transistors 258 and 260, whose output is the horizontal error voltage applied to the input of the horizontal deflection amplifier 84. When the cathode-ray beam of tube 40 lags the beam of camera 22, the output of the correction output circuit is a positive level, and a positive correction is applied to the positive going H ramp at the input to horizontal deflection amplifier 84.

Figure 19:
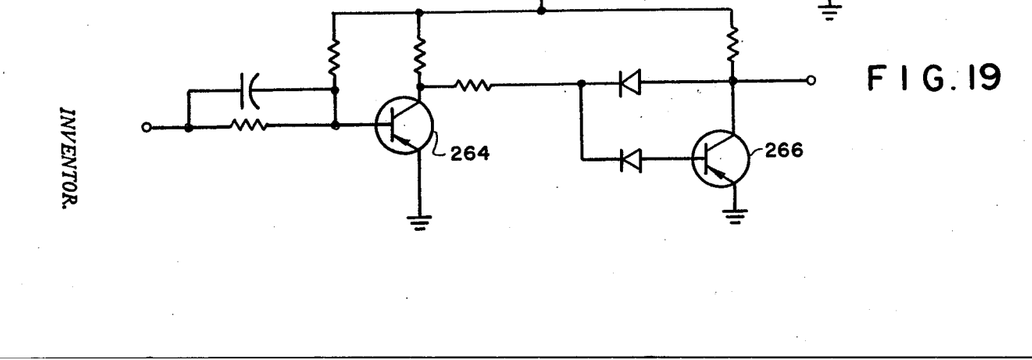
FIG. 19 is a schematic diagram of a pulse shaper.
Figure 20A:
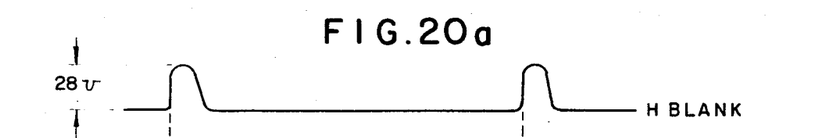
Figure 20B:
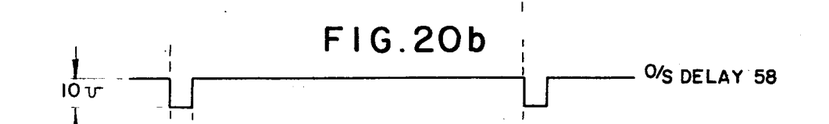
Figure 20C:
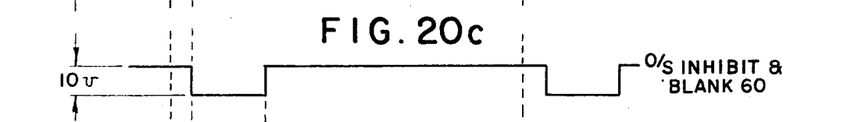
Figure 20D:
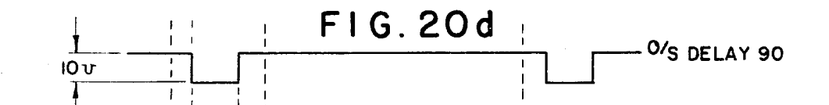
Figure 20E:
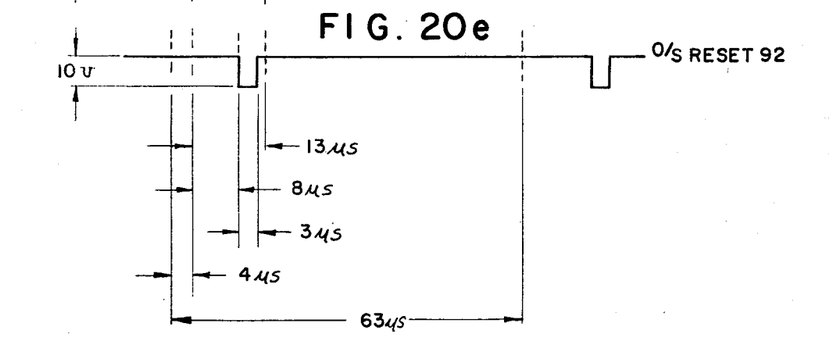

The above-described digital count and comparison occurs during an active line. At the onset of a horizontal retrace, a horizontal blanking pulse is applied to pulse shaper 56. A circuit suitable for use as pulse shaper 56 is shown in FIG. 19. The circuit of FIG. 19 comprises transistors 264 and 266 and their respective associated circuit components. The pulse shaper output is a minus 10 to zero volts pulse which triggers one-shot delay circuit 58. The astable period of circuit 58 is chosen to be about four microseconds and triggers one-shot inhibit and blank circuit 60; the astable period of circuit 60 being chosen to be about thirteen microseconds.

Such output of circuit 50 is inverted by an inverter (not shown) and applied as an input to inhibit gate 52 to prevent passage of any spurious pulses therethrough. Simultaneously, the leading edge of the astable output of circuit 60 is applied to one-shot delay circuit 90 to trigger it; it, in turn, triggering one-shot reset circuit 92 which effects the resetting of all of the binary counter flip-flops to the zero states. The one-shot delay circuit is employed to insure that inhibit gates 78 and 80 are cut off before the flip-flops are reset. After retrace, inhibit gate 52 is enabled.

FIG. 20 shows a timing diagram of waveforms appearing at the output of shaper 56, one-shot delay 58, one-shot inhibit 60, one-shot delay 90 and one-shot reset 92.

While these have been described as what is considered to be a preferred embodiment of this invention, it will be obvious to those skilled in the art that various changes and modifications may be made therein without departing from the invention, and it is therefore aimed to cover all such changes and modifications as fall within the true spirit and scope of the invention.

What is claimed as new and desired to be secured by Letters Patent of the United States is:

1. A television system comprising cathode-ray beam camera means for producing a combined electric signal comprising a first electric signal representing video information relative to a video target and pulses representing a predetermined horizontal position of said video information on the screen of said camera, cathode-ray beam receiver tube means for receiving said video information on its screen and for producing pulses representing the horizontal position of said received video information on said receiver tube screen, camera control means responsive to the application thereto of said combined signal for producing a horizontal ramp signal and a vertical ramp signal for application to said receiver tube means, a video separator responsive to the application thereto of said combined signal for separating said first signal from said camera produced pulses, first and second like counters, means for applying said first signal to said receiver tube means, for applying said camera produced pulses to said first counter, and for applying said receiver tube pulses to said second counter, digital comparison means in circuit with said first and second counters for comparing the contents of said counters to produce an output representing a difference therebetween, and means for modifying said horizontal ramp signal with said last-named difference output.

2. A television system as defined in claim 1, wherein there is further included photomultiplier means to which said receiver tube pulses are applied; the output of said photomultiplier means being applied to said second counter.

3. A television system as defined in claim 2, and further including a horizontal deflection amplifier to which said horizontal ramp signal is applied and a vertical deflection amplifier to which said vertical ramp signal is applied, the outputs of said last-named amplifiers being applied to said receiver tube, said horizontal deflection amplifier comprising an input summing junction to which said horizontal ramp signal and said difference outputs are applied.

4. A television system as defined in claim 3, wherein said camera control means also produces a horizontal blanking signal and wherein first inhibit gate means is included in the input to said first counter, said first inhibit gate means preventing the application of pulses to said first counter at least for the duration of said blanking signal.

5. A television system as defined in claim 4, wherein a vertical blanking trigger signal is produced by said vertical deflection amplifier, and further including a line counter means for applying said horizontal blanking signal to said counter to cycle said counter, a flip-flop responsive to the output of said line counter for producing a set output in response to a given count, second inhibit gate means to which the outputs of said comparison means and said flip-flop are applied, said set output permitting said differences output to be applied to said summing junction, and means for applying said vertical blanking trigger signal to said flip-flop at a chosen count in said line counter to reset said flip-flop to disable said second inhibit gate means.

6. A television system as defined in claim 5, and further including add-subtract correction means in circuit with the output of said second inhibit gate means for applying said difference output to said horizontal deflection amplifier in a polarity in accordance with the difference in the settings of the first and second counters.

7. In a television system as defined in claim 6, wherein there is further included means for applying said horizontal blanking signal to said first and second counter to zero said counters at a chosen time.

8. In a television system as defined in claim 7, wherein first delay means are included for applying said vertical blanking trigger signal to said flip-flop at said chosen count in said line counter, and second delay means are included for applying said horizontal blanking signal as a zeroing input to said first and second counters at said chosen time.

9. In a television system as defined in claim 8, wherein said counters are straight binary counters, each of said counters comprising respective chosen pluralities of binary switching stages.

10. In a television system as defined in claim 9, and further including OR gate means to which there are applied, as inputs, the output of said line counters at a predetermined count and said trigger blanking signal; the output of said OR gate being applied as a reset input to said flip-flop.

References Cited

UNITED STATES PATENTS

| | | | |
|---|---|---|---|
| 2,604,534 | 7/1952 | Graham | 178—6.8 |
| 3,358,184 | 12/1967 | Vitt | 178—6.8 X |

ROBERT L. GRIFFIN, Primary Examiner

R. K. ECKERT, JR., Assistant Examiner

U.S. Cl. X.R.

250—217; 315—26